(12) United States Patent
Hong

(10) Patent No.: US 11,259,332 B2
(45) Date of Patent: Feb. 22, 2022

(54) RANDOM ACCESS METHOD AND APPARATUS, AND ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/646,101

(22) PCT Filed: Sep. 19, 2017

(86) PCT No.: PCT/CN2017/102252
§ 371 (c)(1),
(2) Date: Mar. 10, 2020

(87) PCT Pub. No.: WO2019/056173
PCT Pub. Date: Mar. 28, 2019

(65) Prior Publication Data
US 2020/0205203 A1 Jun. 25, 2020

(51) Int. Cl.
*H04W 74/08* (2009.01)
*H04W 68/00* (2009.01)
*H04W 74/00* (2009.01)

(52) U.S. Cl.
CPC ....... *H04W 74/0833* (2013.01); *H04W 68/00* (2013.01); *H04W 74/004* (2013.01)

(58) Field of Classification Search
CPC .......... H04W 74/0833; H04W 68/00; H04W 74/004
See application file for complete search history.

(56) References Cited

U.S. PATENT DOCUMENTS

| 10,951,380 | B1* | 3/2021 | Costa | H04W 56/001 |
| 2007/0254656 | A1* | 11/2007 | Dalsgaard | H04W 56/0045 |
| | | | | 455/435.1 |
| 2009/0156194 | A1* | 6/2009 | Meylan | H04W 74/0866 |
| | | | | 455/422.1 |

(Continued)

FOREIGN PATENT DOCUMENTS

| CN | 101779393 A | 7/2010 |
| CN | 102438306 A | 5/2012 |

(Continued)

OTHER PUBLICATIONS

International Search Report in the international application No. PCT/CN2017/102252, dated May 31, 2018.

(Continued)

*Primary Examiner* — Dinh Nguyen
(74) *Attorney, Agent, or Firm* — Syncoda LLC; Feng Ma

(57) ABSTRACT

A random access method suitable for a base station includes broadcasting paging information, wherein the paging information includes identification information about a target user equipment and a pre-set first preamble; receiving a preamble sent by the target user equipment; and if the received preamble is the pre-set first preamble, establishing a communication connection with the target user equipment.

18 Claims, 9 Drawing Sheets paging information is broadcast. The paging information contains a preset first preamble and identification information that identifies target User Equipment (UE) — S11 a preamble sent by the target UE is received — S12 a communication connection with the target UE is established if the preamble sent by the target UE is the preset first preamble — S13

(56) References Cited

U.S. PATENT DOCUMENTS

| | | | |
|---|---|---|---|
| 2009/0238366 A1* | 9/2009 | Park | H04W 74/002 380/270 |
| 2010/0014468 A1 | 1/2010 | Lee | |
| 2010/0111028 A1 | 5/2010 | Kim | |
| 2011/0310852 A1* | 12/2011 | Dimou | H04W 36/08 370/332 |
| 2011/0317648 A1 | 12/2011 | Lee | |
| 2014/0056246 A1 | 2/2014 | Chun | |
| 2014/0177568 A1 | 6/2014 | Lee et al. | |
| 2014/0177569 A1 | 6/2014 | Lee et al. | |
| 2014/0233538 A1 | 8/2014 | Zhang | |
| 2015/0055534 A1 | 2/2015 | Chun et al. | |
| 2016/0219626 A1 | 7/2016 | Martin | |
| 2017/0019905 A1 | 1/2017 | Ko et al. | |
| 2017/0034853 A1 | 2/2017 | Rune et al. | |
| 2017/0048889 A1 | 2/2017 | Kadous et al. | |
| 2017/0078966 A1 | 3/2017 | Chun et al. | |
| 2018/0042053 A1 | 2/2018 | Martin | |
| 2019/0045426 A1* | 2/2019 | Yan | H04L 5/0048 |
| 2019/0174480 A1* | 6/2019 | Wong | H04W 72/042 |

FOREIGN PATENT DOCUMENTS

| | | |
|---|---|---|
| CN | 103037530 A | 4/2013 |
| CN | 103139866 A | 6/2013 |
| CN | 103430600 A | 12/2013 |
| CN | 104144467 A | 11/2014 |
| CN | 105142236 A | 12/2015 |
| CN | 105530706 A | 4/2016 |
| CN | 105557056 A | 5/2016 |
| CN | 106063161 A | 10/2016 |
| CN | 106304392 A | 1/2017 |
| CN | 106416375 A | 2/2017 |
| CN | 106793150 A | 5/2017 |
| CN | 107027175 A | 8/2017 |
| CN | 107105485 A | 8/2017 |
| CN | 107105486 A | 8/2017 |

OTHER PUBLICATIONS

English translation of the Written Opinion of the International Search Authority in the international application No. PCT/CN2017/102252, dated May 31, 2018.

Supplementary European Search Report in the European application No. 17926036.9, dated Aug. 13, 2020.

First Office Action of the Chinese application No. 201780001435.X, dated Sep. 28, 2020.

Notice of Allowance of the Chinese application No. 201780001435.X, dated Oct. 27, 2021.

* cited by examiner

RANDOM ACCESS METHOD AND APPARATUS, AND ELECTRONIC DEVICE AND COMPUTER-READABLE STORAGE MEDIUM

CROSS-REFERENCE TO RELATED APPLICATIONS

This application is a national stage of International Application No. PCT/CN2017/102252 filed on Sep. 19, 2017, the disclosure of which is hereby incorporated by reference in its entirety.

TECHNICAL FIELD

The subject disclosure relates to the field of communications, and in particular to a method and device for random access, electronic equipment, and computer-readable storage medium.

BACKGROUND

When establishing a communication connection with a base station, User Equipment (UE) may have to send a preamble to the base station, so that the base station may identify the UE and perform an operation such as synchronization.

However, preambles used by different UE may generally be limited in number. Thus, different UE may send identical preambles to a base station. The base station may have to have the different UE sending identical preambles compete for random access. Thereby, there may be a delay of the random access.

SUMMARY

The subject disclosure provides a method and device for random access, electronic equipment, and computer-readable storage medium, capable of solving a shortcoming in related art.

According to a first aspect of embodiments of the subject disclosure, a method for random access applies to a base station. The method includes:

broadcasting paging information, the paging information containing a preset first preamble and identification information that identifies target User Equipment (UE);

receiving a preamble sent by the target UE; and in response to determining that the preamble sent by the target UE is the preset first preamble, establishing a communication connection with the target UE.

Optionally, the preset first preamble may be set at the base station and/or a core network corresponding to the base station.

Optionally, preambles in the paging information broadcast by the base station may be exactly the same as, partially the same as, or completely different from preambles of paging information broadcast by another base station.

Optionally, the method may further include:

in response to determining that the preamble sent by the target UE is a second preamble pre-stored by the target UE, and a received preamble sent by another target UE is the second preamble pre-stored by the another UE, having the target UE and the another UE compete for access.

According to a second aspect of embodiments of the subject disclosure, a method for random access applies to User Equipment (UE). The method includes:

receiving paging information broadcast by a base station;

determining whether identification information in the paging information is identical to identification information that identifies the UE;

in response to determining that the identification information in the paging information is identical to the identification information that identifies the UE, determining whether the paging information contains a preset first preamble; and in response to determining that the paging information contains the preset first preamble, sending the preset first preamble to the base station.

Optionally, the method may further include:

in response to determining that the paging information does not contain the preset first preamble, sending, to the base station, a second preamble pre-stored.

According to a third aspect of embodiments of the subject disclosure, a device for random access applies to a base station. The method includes a broadcasting module, a request receiving module, and a connection establishing module.

The broadcasting module is adapted to broadcasting paging information. The paging information contains identification information that identifies target User Equipment (UE). The paging information contains a preset first preamble The request receiving module is adapted to receiving a preamble sent by the target UE.

The connection establishing module is adapted to, in response to determining that the preamble sent by the target UE is the preset first preamble, establishing a communication connection with the target UE.

Optionally, the preset first preamble may be set at the base station and/or a core network corresponding to the base station.

Optionally, preambles in the paging information broadcast by the base station may be exactly the same as, partially the same as, or completely different from preambles of paging information broadcast by another base station.

Optionally, the device may further include a competitive solution module.

The competitive solution module may be adapted to, in response to determining that the preamble sent by the target UE is a second preamble pre-stored by the target UE, and a received preamble sent by another target UE is the second preamble pre-stored by the another UE, having the target UE and the another UE compete for access.

According to a fourth aspect of embodiments of the subject disclosure, a device for random access applies to User Equipment (UE). The method includes a paging receiving module, an information determining module, a preamble determining module, and a request sending module.

The paging receiving module is adapted to receiving paging information broadcast by a base station.

The information determining module is adapted to determining whether identification information in the paging information is identical to identification information that identifies the UE.

The preamble determining module is adapted to, in response to determining that the identification information in the paging information is identical to the identification information that identifies the UE, determining whether the paging information contains a preset first preamble.

The request sending module is adapted to, in response to determining that the paging information contains the preset first preamble, sending the preset first preamble to the base station.

Optionally, the request sending module may be further adapted to, in response to determining that the paging information does not contain the preset first preamble, sending, to the base station, a second preamble pre-stored.

Electronic equipment according to a fifth aspect of embodiments of the subject disclosure includes a processor and memory.

The memory is adapted to storing an instruction executable by the processor.

The processor is adapted to:

broadcasting paging information, the paging information containing a preset first preamble and identification information that identifies target User Equipment (UE);

receiving a preamble sent by the target UE; and in response to determining that the preamble sent by the target UE is the preset first preamble, establishing a communication connection with the target UE.

Electronic equipment according to a sixth aspect of embodiments of the subject disclosure includes a processor and memory.

The memory is adapted to storing an instruction executable by the processor.

The processor is adapted to:

receiving paging information broadcast by a base station;

determining whether identification information in the paging information is identical to identification information that identifies the UE;

in response to determining that the identification information in the paging information is identical to the identification information that identifies the UE, determining whether the paging information contains a preset first preamble;

in response to determining that the paging information contains the preset first preamble, sending the preset first preamble to the base station.

According to a seventh aspect of embodiments of the subject disclosure, a computer-readable storage medium has stored thereon a computer program. When executed by a processor, the computer program causes the processor to perform:

broadcasting paging information, the paging information containing a preset first preamble and identification information that identifies target User Equipment (UE);

receiving a preamble sent by the target UE; and in response to determining that the preamble sent by the target UE is the preset first preamble, establishing a communication connection with the target UE.

According to an eighth aspect of embodiments of the subject disclosure, a computer-readable storage medium has stored thereon a computer program. When executed by a processor, the computer program causes the processor to perform:

receiving paging information broadcast by a base station;

determining whether identification information in the paging information is identical to identification information that identifies the UE;

in response to determining that the identification information in the paging information is identical to the identification information that identifies the UE, determining whether the paging information contains a preset first preamble; and in response to determining that the paging information contains the preset first preamble, sending the preset first preamble to the base station.

The technical solution provided by embodiments of the present disclosure includes beneficial effects as follows.

With the embodiments herein, as only the target UE may send the preset first preamble to the base station to request random access, while a preamble sent to the base station by other UE requesting random access differs from the preset first preamble, at least one of the two preambles sent to the base station respectively by two UE is different from the preset first preamble. Therefore, it is guaranteed that each time after broadcasting the paging information carrying the preset first preamble, the base station may receive only one preset first preamble. Accordingly, the target UE sending the preset first preamble does not have to compete for access, such that the base station may feed a random access response back to the target UE according to the preset first preamble fast and accurately, thus allowing the target UE to establish a communication connection with the base station fast, avoiding a delay of the random access process.

The above general description and elaboration below are but exemplary and explanatory, and do not limit the subject disclosure.

BRIEF DESCRIPTION OF DRAWINGS

Drawings for describing embodiments herein are introduced below briefly for clearer illustration of a technical solution of embodiments herein. Note that the drawings described below refer merely to some embodiments herein. A person having ordinary skill in the art may acquire other drawings according to the drawings herein without creative effort.

DETAILED DESCRIPTION

Clear complete description to a technical solution herein is given below with reference to the drawings and embodiments herein. Clearly, embodiments illustrated herein are but some, instead of all, embodiments according to the subject disclosure. Based on the embodiments herein, a person having ordinary skill in the art may acquire another embodiment without creative effort. Any such embodiment falls within the scope of the subject disclosure.

Figure 1:
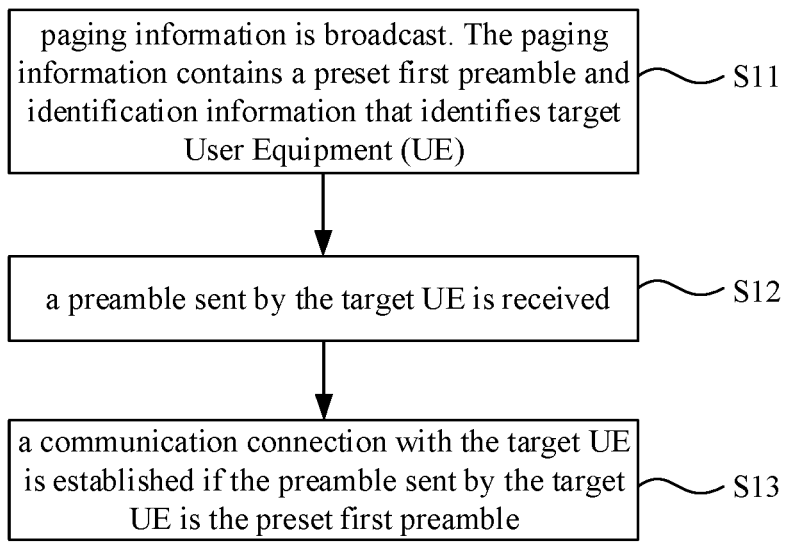
FIG. 1 is a flowchart of a method for random access according to an exemplary embodiment.

FIG. 1 is a flowchart of a method for random access according to an exemplary embodiment. The method according to the embodiment may apply to a base station. As shown in FIG. 1, the method for random access may include at least one step as follows.

In S11, paging information is broadcast. The paging information contains a preset first preamble and identification information that identifies target User Equipment (UE).

According to an embodiment, for fast establishment of a communication connection with target UE, a base station may broadcast paging information. The paging information may contain identification information that identifies the target UE. The paging information may contain a preset first preamble. For establishment (instead of fast establishment) of a communication connection with another UE, the base station may broadcast paging information containing identification information that identifies the another UE (instead of the preset first preamble). That is, among paging information broadcast by the base station, only the paging information containing the identification information that identifies the target UE may contain the preset first preamble, thereby guaranteeing that only the target UE may acquire the preset first preamble.

According to an embodiment, when target UE has monitored paging information broadcast by a base station that contains a preset first preamble and identification information that identifies the target UE, the target UE may extract the identification information carried by the paging information. The target UE may determine whether the identification information extracted corresponds to the identification information that identifies the target UE. If the identification information extracted does correspond to the identification information that identifies the target UE, the target UE may determine that the base station is to establish a communication connection with the target UE. Then, the target UE may further determine whether the paging information contains the preset first preamble. If the paging information does contain the preset first preamble, the target UE may extract the preset first preamble. The target UE may send the preset first preamble to the base station to request random access.

Accordingly, it may be guaranteed that only the target UE may send the preset first preamble to the base station in performing random access, while a preamble sent by another UE to the base station in performing random access differs from the preset first preamble.

In case that the paging information does not contain the preset first preamble, the target UE may acquire a second preamble that is pre-stored. The target UE may send the second preamble to the base station to request random access.

In S12, a preamble sent by the target UE is received.

In S13, a communication connection with the target UE is established if the preamble sent by the target UE is the preset first preamble.

According to an embodiment, after a base station has received a preamble sent by UE, the base station may determine whether the preamble is the preset first preamble. If the preamble is the preset first preamble, then the base station may determine, according to the preset first preamble, that the UE sending the preset first preamble requests fast random access.

As only the target UE may send the preset first preamble to the base station to request random access, while a preamble sent by another UE to the base station in performing random access differs from the preset first preamble, at least one of the two preambles sent to the base station respectively by two UE is different from the preset first preamble. Therefore, it is guaranteed that each time after broadcasting the paging information carrying the preset first preamble, the base station may receive only one preset first preamble. Accordingly, the target UE sending the preset first preamble does not have to compete for access, such that the base station may feed a random access response back to the target UE according to the preset first preamble fast and accurately, thus allowing the target UE to establish a communication connection with the base station fast, avoiding a delay of the random access process.

Optionally, the preset first preamble may be set at the base station. The preset first preamble may be set at a core network corresponding to the base station.

According to an embodiment, the preset first preamble may be set at the base station side. For example, multiple base stations may negotiate to set the preset first preamble. Accordingly, paging information broadcast by different base stations may carry exactly the same preambles. Paging information broadcast by different base stations may carry preambles that are partially the same. Paging information broadcast by different base stations may carry completely different preambles.

According to an embodiment, the preset first preamble may as well be set at a core network side. For example, the preset first preamble may be input by an operator on equipment of the core network. The preset first preamble may be transmitted to the base station through the core network. Different preset first preambles may be transmitted to different base stations. Identical preset first preambles may be transmitted to different base stations.

Accordingly, a mode in setting the preset first preamble may be selected conveniently as needed.

Optionally, preambles in the paging information broadcast by the base station may be exactly the same as preambles of paging information broadcast by another base station. Preambles in the paging information broadcast by the base station may be partially the same as preambles of paging information broadcast by another base station. Preambles in the paging information broadcast by the base station may be completely different from preambles of paging information broadcast by another base station.

According to an embodiment, paging information broadcast by a base station (such as a first base station) may carry multiple preambles. For example, in an embodiment shown in FIG. 1, for fast establishment of a communication connection with target UE, a base station (such as a first base station) may broadcast paging information. The paging information may contain identification information that identifies the target UE. The paging information may further contain a preset first preamble. On basis of this, for fast establishment of a communication connection with first UE (which may be different from the target UE), the base station (such as the first base station) may broadcast paging information containing both identification information that identifies the first UE, and a preset third preamble. The preset third preamble may differ from the preset first preamble. Accordingly, the target UE may send the preset first preamble to the base station, while the first UE may send the preset third preamble to the base station.

For fast establishment of a communication connection with UE, another base station (such as a second base station) may broadcast paging information carrying preambles exactly the same as those carried by paging information broadcast by a base station (such as a first base station) in the embodiment shown in FIG. 1. For example, just like the first base station, the second base station may broadcast paging information carrying both the preset first preamble and the preset third preamble. For example, the second base station may broadcast paging information containing both identification information that identifies second UE and the preset first preamble. The second base station may broadcast paging information containing both identification information that identifies third UE and the preset third preamble.

Another base station (such as a second base station) may broadcast paging information carrying preambles partially the same as those carried by paging information broadcast by a base station (such as the first base station) in the embodiment shown in FIG. 1. For example, paging information broadcast by the second base station may carry the preset first preamble or the preset third preamble, and another preamble different from the preset first preamble and the preset third preamble. For example, the second base station may broadcast paging information containing both identification information that identifies second UE and the preset first preamble or the preset third preamble. The second base station may broadcast paging information containing both identification information that identifies third UE and a preset fourth preamble. The preset fourth preamble may be different from the preset first preamble and the preset third preamble.

Another base station (such as a second base station) may broadcast paging information carrying preambles completely different from those carried by paging information broadcast by a base station (such as the first base station) in the embodiment shown in FIG. 1. For example, paging information broadcast by the second base station may carry neither the preset first preamble nor the preset third preamble. For example, the second base station may broadcast paging information containing both identification information that identifies second UE and a preset fourth preamble. The preset fourth preamble may be different from the preset first preamble and the preset third preamble. The second base station may broadcast paging information containing both identification information that identifies third UE and a preset fifth preamble. The preset fifth preamble may be different from the preset first preamble and the preset third preamble.

A base station which broadcasts paging information carrying preambles exactly the same as those carried by paging information broadcast by the base station in the embodiment shown in FIG. 1 may belong to the same Tracking Area (TA), the same RAN Notification Area (RNA), or the same core network, as the base station in the embodiment shown in FIG. 1.

Accordingly, preambles carried by paging information broadcast by different base stations may be set flexibly as needed, to be exactly the same, partially the same, or completely different.

Figure 2:
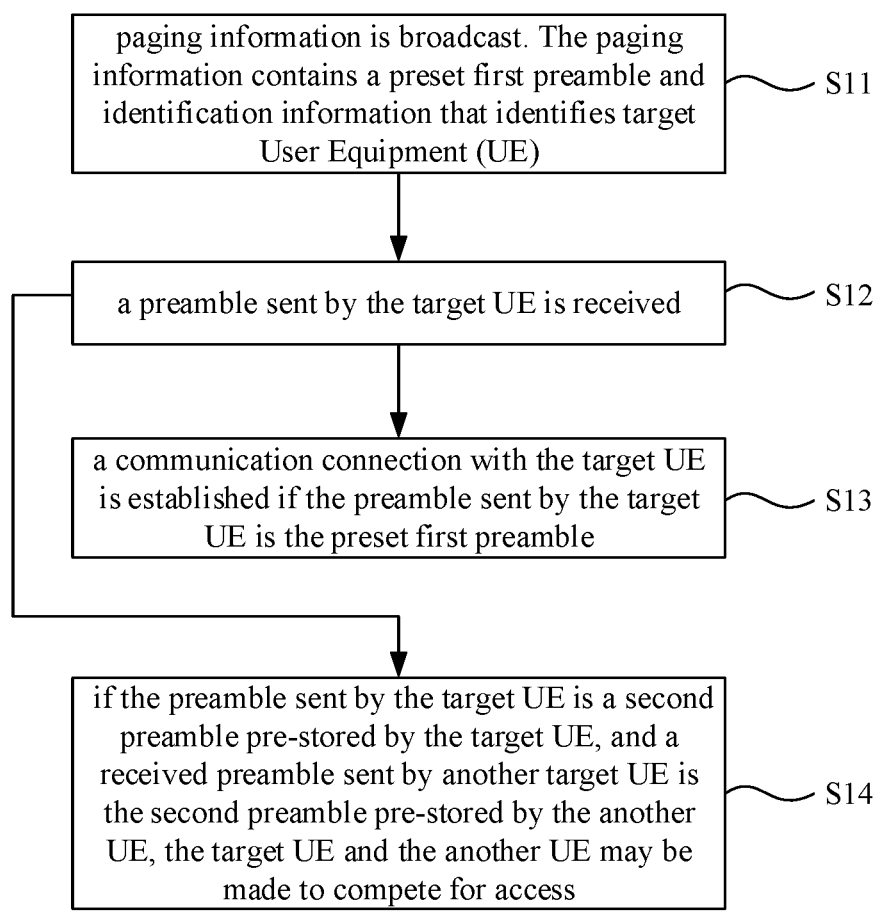
FIG. 2 is a flowchart of a method for random access according to an exemplary embodiment.

FIG. 2 is a flowchart of a method for random access according to an exemplary embodiment. As shown in FIG. 2, the method for random access may further include a step as follows.

In S14, if the preamble sent by the target UE is a second preamble pre-stored by the target UE, and a received preamble sent by another target UE is the second preamble pre-stored by the another UE, the target UE and the another UE may be made to compete for access.

According to an embodiment, among paging information broadcast by the base station, only paging information containing the identification information that identifies the target UE may contain the preset first preamble, while paging information containing identification information that identifies another UE may contain no preamble at all. Therefore, UE other than the target UE may request random access by sending a pre-stored second preamble to the base station, thus establishing a communication connection with the base station.

In case that paging information containing the identification information that identifies the target UE does not contain the preset first preamble, the target UE may acquire the second preamble that is pre-stored. The target UE may send the pre-stored second preamble to the base station to perform random access.

Accordingly, the target UE may send the base station a preamble same as one sent by another UE to the base station. Having received the preambles, and determined the preambles to be identical, such as both to be the pre-stored second preamble, the base station may have the target UE and the another UE compete for access, i.e., provide a competitive solution for the two UE.

The base station may or may not parse out the second preamble.

If the second preamble can be parsed out, the base station may send a Random Access Response (RAR) respectively to the target UE and the another UE in a second random access message MSG2, and send a competition/contention resolution message (also referred to as a conflict resolution message) respectively to the target UE and the another UE in a fourth random access message (MSG4).

If the second preamble cannot be parsed out, the base station may send no RAR to the target UE and the another UE. Or, the base station may send, to the target UE and the another UE, a RAR carrying Back off (compensation information). If no RAR is received within a preset first duration, or a RAR carrying Back off information is received, the target UE and the another UE may wait for a second preset duration, and then each may resend a pre-stored preamble (which may or may not be the preset second preamble).

Figure 3:
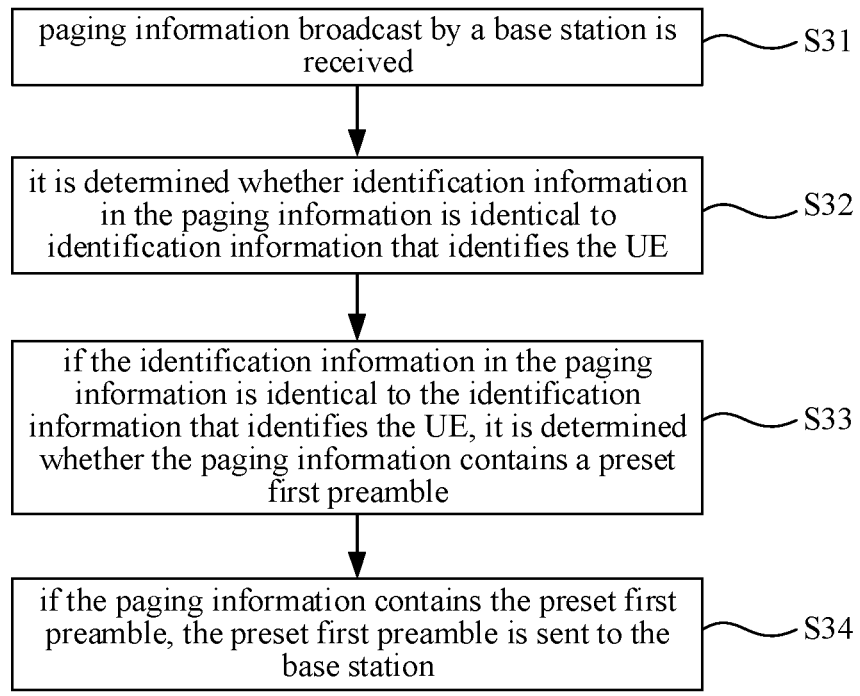
FIG. 3 is a flowchart of a method for random access according to an exemplary embodiment.

FIG. 3 is a flowchart of a method for random access according to an exemplary embodiment. The method for random access may apply to UE such as a mobile phone, a tablet computer, a smart watch, etc. As shown in FIG. 3, the method for random access may include at least one step as follows.

In S31, paging information broadcast by a base station is received.

In S32, it is determined whether identification information in the paging information is identical to identification information that identifies the UE.

In S33, if the identification information in the paging information is identical to the identification information that identifies the UE, it is determined whether the paging information contains a preset first preamble.

According to an embodiment, if the identification information in the paging information is identical to the identification information that identifies the UE, then it may be determined that the base station is to establish a communication connection with the UE.

In S34, if the paging information contains the preset first preamble, the preset first preamble is sent to the base station.

According to an embodiment, if the paging information further contains the preset first preamble, it may be determined that the base station requires fast establishment of a communication connection with the UE. Accordingly, the UE may send the preset first preamble to the base station to request random access of the base station.

Among paging information broadcast by the base station, only paging information containing identification information that identifies the UE may contain the preset first preamble, thereby guaranteeing that only the UE may acquire the preset first preamble. That is, a preamble sent to the base station by other UE requesting random access differs from the preset first preamble, and thus at least one of the two preambles sent to the base station respectively by two UE is different from the preset first preamble. Therefore, it is guaranteed that each time after broadcasting the paging information carrying the preset first preamble, the base station may receive only one preset first preamble. Accordingly, the target UE sending the preset first preamble does not have to compete for access, such that the base station may feed a random access response back to the target UE according to the preset first preamble fast and accurately, thus allowing the UE to establish a communication connection with the base station fast, avoiding a delay of the random access process.

Figure 4:
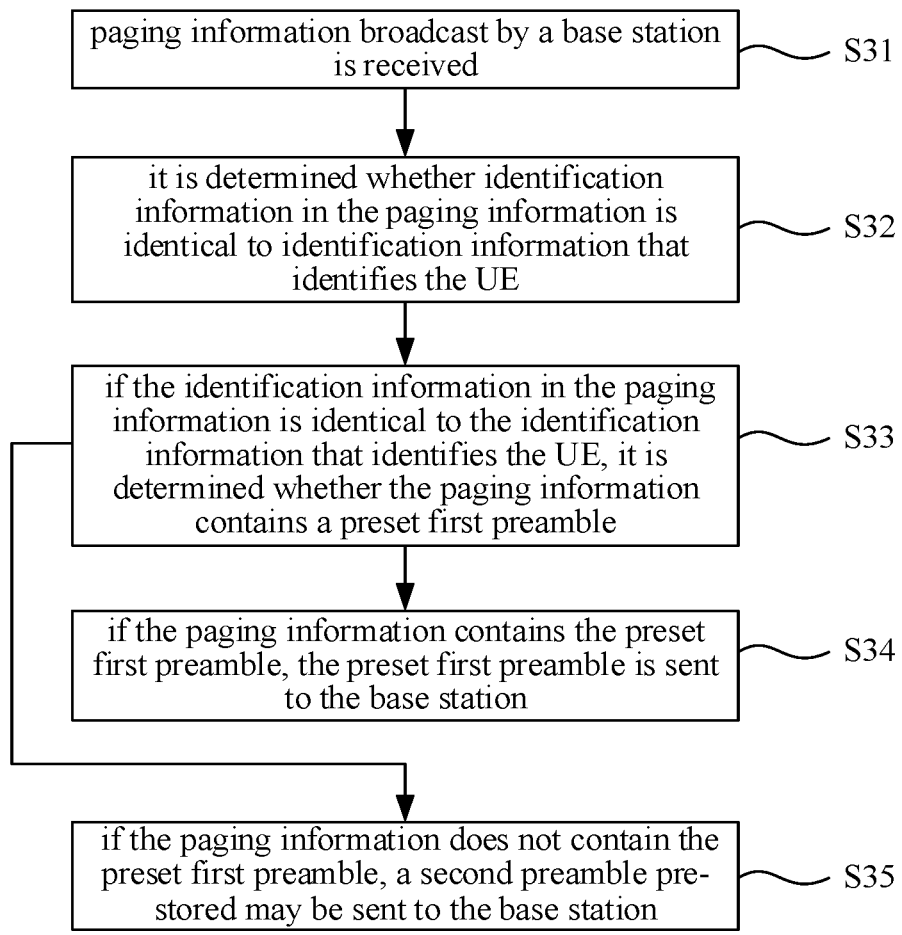
FIG. 4 is a flowchart of a method for random access according to an exemplary embodiment.

FIG. 4 is a flowchart of a method for random access according to an exemplary embodiment. As shown in FIG. 4, the method for random access may further include a step as follows.

In S35, if the paging information does not contain the preset first preamble, a second preamble pre-stored may be sent to the base station.

According to an embodiment, UE may pre-store a second preamble. If identification information in paging information is the same as identification information that identifies the UE, but does not contain the preset first preamble, then it may be determined that the base station requires a communication connection with the UE, however does not require fast establishment of the connection. Therefore, the UE may send the base station the pre-stored second preamble to request random access of the base station, thus establishing a communication connection with the base station.

A device for random access according to an embodiment herein corresponds to the method for random access according to an aforementioned embodiment herein.

Figure 5:
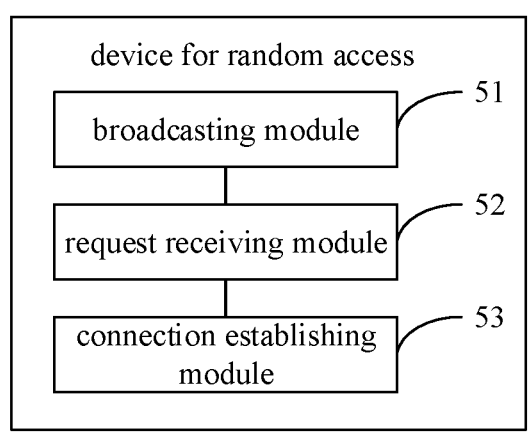
FIG. 5 is a diagram of a device for random access according to an exemplary embodiment.

FIG. 5 is a diagram of a device for random access according to an exemplary embodiment. The device for random access may apply to a base station. As shown in FIG. 5, the device for random access includes a broadcasting module, a request receiving module, and a connection establishing module.

The broadcasting module 51 is adapted to broadcasting paging information. The paging information contains identification information that identifies target UE. The paging information contains a preset first preamble.

The request receiving module 52 is adapted to receiving a preamble sent by the target UE.

The connection establishing module 53 is adapted to, in response to determining that the preamble sent by the target UE is the preset first preamble, establishing a communication connection with the target UE.

According to an embodiment, after a base station has received a preamble sent by UE, the base station may determine whether the preamble is the preset first preamble. If the preamble is the preset first preamble, then the base station may determine, according to the preset first preamble, that the UE sending the preset first preamble requests fast random access.

As only the target UE may send the preset first preamble to the base station to request random access, while a preamble sent by another UE to the base station in performing random access differs from the preset first preamble, at least one of the two preambles sent to the base station respectively by two UE is different from the preset first preamble. Therefore, it is guaranteed that each time after broadcasting the paging information carrying the preset first preamble, the base station may receive only one preset first preamble. Accordingly, the target UE sending the preset first preamble does not have to compete for access, such that the base station may feed a random access response back to the target UE according to the preset first preamble fast and accurately, thus allowing the target UE to establish a communication connection with the base station fast, avoiding a delay of the random access process.

Optionally, the preset first preamble may be set at the base station. The preset first preamble may be set at a core network corresponding to the base station.

Accordingly, a mode in setting the preset first preamble may be selected conveniently as needed.

Optionally, preambles in the paging information broadcast by the base station may be exactly the same as preambles of paging information broadcast by another base station. Preambles in the paging information broadcast by the base station may be partially the same as preambles of paging information broadcast by another base station. Preambles in the paging information broadcast by the base station may be completely different from preambles of paging information broadcast by another base station.

Accordingly, preambles carried by paging information broadcast by different base stations may be set flexibly as needed, to be exactly the same, partially the same, or completely different.

Figure 6:
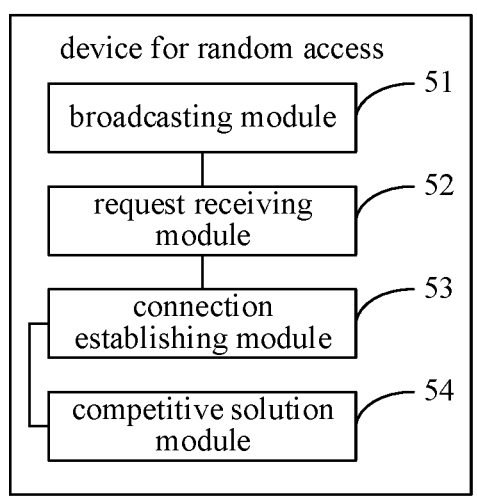
FIG. 6 is a diagram of a device for random access according to an exemplary embodiment.

FIG. 6 is a diagram of a device for random access according to an exemplary embodiment. As shown in FIG. 6, the device for random access may further include a module as follows.

The differentiating module 54 may be adapted to, in response to determining that the preamble sent by the target UE is a second preamble pre-stored by the target UE, and a received preamble sent by another target UE is the second preamble pre-stored by the another UE, having the target UE and the another UE compete for access.

According to an embodiment, among paging information broadcast by the base station, only paging information containing the identification information that identifies the target UE may contain the preset first preamble, while paging information containing identification information that identifies another UE may contain no preamble at all. Therefore, UE other than the target UE may request random access by sending a pre-stored second preamble to the base station, thus establishing a communication connection with the base station.

Figure 7:
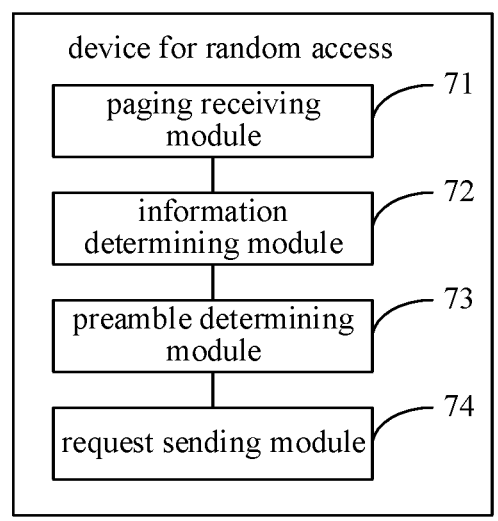
FIG. 7 is a diagram of a device for random access according to an exemplary embodiment.

FIG. 7 is a diagram of a device for random access according to an exemplary embodiment. The device for random access may apply to UE. As shown in FIG. 7, the device for random access may include a paging receiving module, an information determining module, a preamble determining module, and a request sending module.

The paging receiving module 71 is adapted to receiving paging information broadcast by a base station.

The information determining module 72 is adapted to determining whether identification information in the paging information is identical to identification information that identifies the UE.

The preamble determining module 73 is adapted to, in response to determining that the identification information in the paging information is identical to the identification information that identifies the UE, determining whether the paging information contains a preset first preamble.

The request sending module 74 is adapted to, in response to determining that the paging information contains the preset first preamble, sending the preset first preamble to the base station.

According to an embodiment, if the paging information further contains the preset first preamble, it may be determined that the base station requires fast establishment of a communication connection with the UE. Accordingly, the UE may send the preset first preamble to the base station to request random access of the base station.

Among paging information broadcast by the base station, only paging information containing identification information that identifies the UE may contain the preset first preamble, thereby guaranteeing that only the UE may acquire the preset first preamble. That is, a preamble sent to the base station by other UE requesting random access differs from the preset first preamble, and thus at least one of the two preambles sent to the base station respectively by two UE is different from the preset first preamble. Therefore, it is guaranteed that each time after broadcasting the paging information carrying the preset first preamble, the base station may receive only one preset first preamble. Accordingly, the target UE sending the preset first preamble does not have to compete for access, such that the base station may feed a random access response back to the target UE according to the preset first preamble fast and accurately, thus allowing the UE to establish a communication connection with the base station fast, avoiding a delay of the random access process.

Optionally, the request sending module may be further adapted to sending a pre-stored second preamble to the base station if the paging information does not contain the preset first preamble.

According to an embodiment, UE may pre-store a second preamble. If identification information in paging information is the same as identification information that identifies the UE, but does not contain the preset first preamble, then it may be determined that the base station requires a communication connection with the UE, however does not require fast establishment of the connection. Therefore, the UE may send the base station the pre-stored second preamble to request random access of the base station, thus establishing a communication connection with the base station.

A module of the device according to at least one embodiment herein may execute an operation in a mode elaborated in at least one embodiment of the method herein, which will not be repeated here.

A device embodiment herein basically corresponds to a method embodiment herein, description of which may be referred to for a related part of the device embodiment. A device embodiment described herein is but schematic. Modules described herein as separate parts may or may not be physically separate. A part displayed as a module may or may not be a physical module. That is, it may be located in one place, or distributed over multiple network modules. Some or all of the modules herein may be selected as needed to achieve an effect of a solution herein. A person having ordinary skill in the art may understand and implement the above without creative effort.

According to an embodiment herein, electronic equipment includes a processor and memory.

The memory is adapted to storing an instruction executable by the processor.

The processor is adapted to:
broadcasting paging information, the paging information containing a preset first preamble and identification information that identifies target User Equipment (UE);
receiving a preamble sent by the target UE; and
in response to determining that the preamble sent by the target UE is the preset first preamble, establishing a communication connection with the target U.

According to an embodiment herein, electronic equipment includes a processor and memory.

The memory is adapted to storing an instruction executable by the processor.

The processor is adapted to:
receiving paging information broadcast by a base station;
determining whether identification information in the paging information is identical to identification information that identifies the UE;
in response to determining that the identification information in the paging information is identical to the identification information that identifies the UE, determining whether the paging information contains a preset first preamble;
in response to determining that the paging information contains the preset first preamble, sending the preset first preamble to the base station.

According to an embodiment herein, a computer-readable storage medium has stored thereon a computer program that, when executed by a processor, causes the processor to perform:
broadcasting paging information, the paging information containing a preset first preamble and identification information that identifies target User Equipment (UE);
receiving a preamble sent by the target UE; and
in response to determining that the preamble sent by the target UE is the preset first preamble, establishing a communication connection with the target UE.

According to an embodiment herein, a computer-readable storage medium has stored thereon a computer program that, when executed by a processor, causes the processor to perform:
receiving paging information broadcast by a base station;
determining whether identification information in the paging information is identical to identification information that identifies the UE;
in response to determining that the identification information in the paging information is identical to the identification information that identifies the UE, determining whether the paging information contains a preset first preamble; and
in response to determining that the paging information contains the preset first preamble, sending the preset first preamble to the base station.

Figure 8:
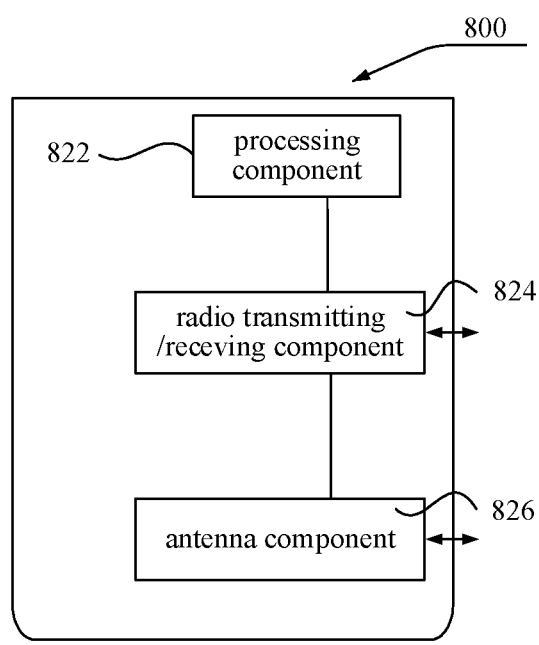
FIG. 8 is a diagram of a structure of a device for random access according to an exemplary embodiment.

FIG. 8 is a diagram of a structure of a device 800 for random access according to an exemplary embodiment. As shown in FIG. 8, the device 800 may be provided as a base station. Referring to FIG. 8, the device 800 includes a processing component 822, a radio transmitting/receiving component 824, an antenna component 826, and a signal processing part dedicated to a radio interface. The processing component 822 may further include one or more processors. A processor of the processing component 822 may be adapted to performing the method shown in FIG. 1.

Figure 9:
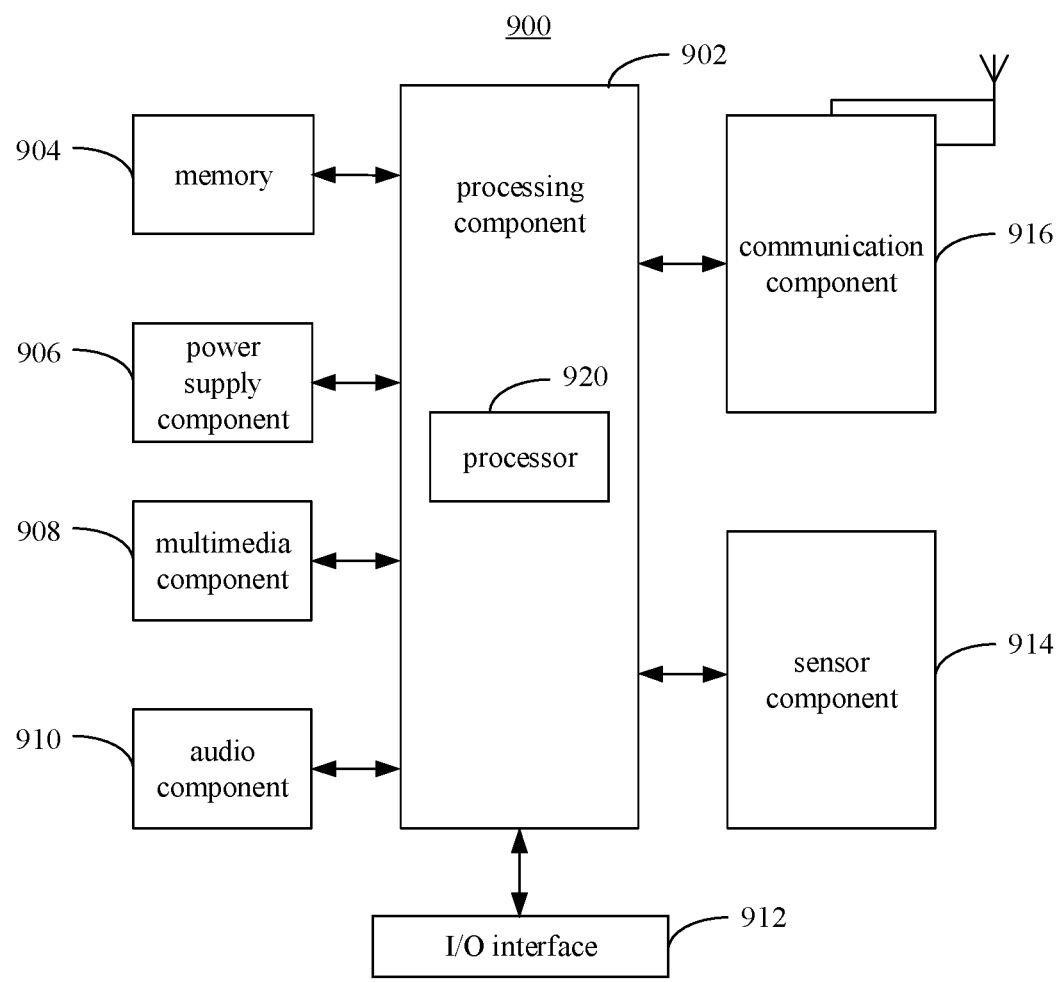
FIG. 9 is a diagram of a structure of a device for random access according to an exemplary embodiment.

FIG. 9 is a diagram of a structure of a device 900 for random access according to an exemplary embodiment. For example, the device 900 may be a mobile phone, a computer, a digital broadcast terminal, messaging equipment, a gaming console, tablet equipment, medical equipment, exercise equipment, a personal digital assistant, etc.

Referring to FIG. 9, the device 900 may include at least one of a processing component 902, memory 904, a power supply component 906, a multimedia component 908, an audio component 910, an Input/Output (I/O) interface 912, a sensor component 914, or a communication component 916.

The processing component 902 may generally control an overall operation of the device 900, such as operations associated with display, a telephone call, data communication, a camera operation, a recording operation, etc. The processing component 902 may include one or more processors 920 to execute instructions so as to complete all or a part of an aforementioned method. In addition, the processing component 902 may include one or more portions to facilitate interaction between the processing component 902 and other components. For example, the processing component 902 may include a multimedia portion to facilitate interaction between the multimedia component 908 and the processing component 902.

The memory 904 may be adapted to storing various types of data to support the operation at the device 900. Examples of such data may include instructions of any application or method adapted to operating on the device 900, contact data, phonebook data, messages, pictures, videos, etc. The memory 904 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 906 may supply electric power to various components of the device 900. The power supply component 906 may include a power management system, one or more power sources, and other components related to generating, managing, and distributing electricity for the device 900.

The multimedia component 908 may include a screen that provides an output interface between the device 900 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 908 may include at least one of a front camera or a rear camera. When the device 900 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 910 may be adapted to outputting and/or inputting an audio signal. For example, the audio component 910 may include a microphone (MIC). When the device 900 is in an operation mode such as a call mode, a recording mode, a voice recognition mode, etc., the MIC may be adapted to receiving an external audio signal. The received audio signal may be further stored in the memory 904 or may be sent via the communication component 916. The audio component 910 may further include a loudspeaker adapted to outputting the audio signal.

The I/O interface 99 may provide an interface between the processing component 902 and a peripheral interface portion. Such a peripheral interface portion may be a keypad, a click wheel, a button, etc. Such a button may include but is not limited to at least one of a homepage button, a volume button, a start button, or a lock button.

The sensor component 914 may include one or more sensors for assessing various states of the device 900. For example, the sensor component 914 may detect an on/off state of the device 900 and relative positioning of components such as the display and the keypad of the device 900. The sensor component 914 may further detect a change in the position of the device 900 or of a component of the device 900, whether there is contact between the device 900 and a user, the orientation or acceleration/deceleration of the device 900, a change in the temperature of the device 900, etc. The sensor component 914 may include a proximity sensor adapted to detecting existence of a nearby object without physical contact. The sensor component 914 may further include an optical sensor such as a Complementary Metal-Oxide-Semiconductor (CMOS) or a Charge-Coupled-Device (CCD) image sensor used in an imaging application. The sensor component 914 may further include an acceleration sensor, a gyroscope sensor, a magnetic sensor, a pressure sensor, a temperature sensor, etc.

The communication component 916 may be adapted to facilitating wired or wireless communication between the device 900 and other equipment. The device 900 may access a wireless network based on a communication standard such as Wi-Fi, 2G, 3G . . . , or a combination thereof. The communication component 916 may broadcast related information or receive a broadcast signal from an external broadcast management system via a broadcast channel. The communication component 916 may include a Near Field Communication (NFC) portion for short-range communication. For example, the NFC portion may be based on technology such as Radio Frequency Identification (RFID), Infrared Data Association (IrDA), Ultra-Wideband (UWB) technology, Bluetooth (BT), etc.

The device 900 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the embodiment shown in FIG. 3.

A non-transitory computer-readable storage medium including instructions, such as memory 904 including instructions, may be provided. The instructions may be executed by the processor 920 of the device 900 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

A device embodiment herein basically corresponds to a method embodiment herein, description of which may be referred to for a related part of the device embodiment. A device embodiment described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution herein. A person having ordinary skill in the art may understand and implement the above without creative effort.

Note that herein, a relation term such as "first", "second", etc., is used merely to differentiate one entity or operation from another without necessarily requiring or implying existence of such an actual relation or order between such entities. A term such as "including/comprising", "containing", or any other variant thereof is intended to cover a non-exclusive inclusion, such that a process, method, article, or equipment including a series of elements not only includes the elements, but also includes other element(s) not explicitly listed, or element(s) inherent to such a process, method, article, or equipment. Given no more limitation, an element defined by a phrase "including a . . . " does not exclude existence of another identical element in a process, method, article, or device that includes the element.

Elaborated above are the method and device according to embodiments herein. The principle and the mode of implementation herein are illustrated with reference to specific examples. The embodiments are described merely to facilitate understanding of the method herein and the core concept thereof. A person having ordinary skill in the art may change a range or mode of the implementation according to the concept herein. Content herein shall not be taken as limiting the subject disclosure.

The invention claimed is:

1. A method for random access, implemented by applying to a base station, the method comprising:
   for fast establishment of a communication connection with target User Equipment (UE), broadcasting paging information, wherein the paging information contains a preset first preamble and identification information that identifies the target UE, and for establishment, instead of fast establishment, of a communication connection with another UE, broadcasting paging information containing identification information that identifies the another UE, without the preset first preamble;
   receiving a preamble sent by the target UE; and
   in response to determining that the preamble sent by the target UE is the preset first preamble, establishing the communication connection with the target UE.

2. The method of claim 1, wherein the preset first preamble is set at the base station and/or a core network corresponding to the base station.

3. The method of claim 1, wherein preambles in the paging information broadcast by the base station are exactly the same as, partially the same as, or completely different from preambles of paging information broadcast by another base station.

4. The method of claim 1, further comprising:
   in response to determining that the preamble sent by the target UE is a second preamble pre-stored by the target UE, and a received preamble sent by the another UE is the second preamble pre-stored by the another UE, having the target UE and the another UE compete for access.

5. A method for random access, implemented by User Equipment (UE), the method comprising:
   receiving paging information broadcast by a base station, wherein for fast establishment of a communication connection with target UE, the paging information broadcast by the base station contains a preset first preamble and identification information that identifies the target UE, and for establishment, instead of fast establishment, of a communication connection with another UE, the paging information broadcast by the base station contains identification information that identifies the another UE, without the preset first preamble;
   determining whether identification information in the paging information is identical to identification information that identifies the UE;
   in response to determining that the identification information in the paging information is identical to the identification information that identifies the UE, determining whether the paging information contains the preset first preamble; and
   in response to determining that the paging information contains the preset first preamble, sending the preset first preamble to the base station.

6. The method of claim 5, further comprising:
   in response to determining that the paging information does not contain the preset first preamble, sending, to the base station, a second preamble pre-stored.

7. The base station implementing the method for random access of claim 1, comprising a processor, and memory storing instructions for execution by the processor to implement operations of the method.

8. The base station of claim 7, wherein the preset first preamble is set at the base station and/or a core network corresponding to the base station.

9. The base station of claim 7, wherein preambles in the paging information broadcast by the base station are exactly the same as, partially the same as, or completely different from preambles of paging information broadcast by another base station.

10. The base station of claim 7,
    wherein the processor is further adapted to, in response to determining that the preamble sent by the target UE is a second preamble pre-stored by the target UE, and a received preamble sent by the another UE is the second preamble pre-stored by the another UE, having the target UE and the another UE compete for access.

11. User Equipment (UE), comprising a processor, and memory storing instructions for execution by the processor to:
    receive paging information broadcast by a base station, wherein for fast establishment of a communication connection with target UE, the paging information broadcast by the base station contains a preset first preamble and identification information that identifies the target UE, and for establishment, instead of fast establishment, of a communication connection with another UE, the paging information broadcast by the base station contains identification information that identifies the another UE, without the preset first preamble;
    determine whether identification information in the paging information is identical to identification information that identifies the UE,
    in response to determining that the identification information in the paging information is identical to the identification information that identifies the UE, determine whether the paging information contains the preset first preamble,
    in response to determining that the paging information contains the preset first preamble, send the preset first preamble to the base station.

12. The UE of claim 11, wherein the processor is further adapted to, in response to determining that the paging information does not contain the preset first preamble, sending, to the base station, a second preamble pre-stored.

13. A communication system implementing the method of claim 1, comprising the base station, wherein only the target UE is allowed to send the preset first preamble to the base station to request random access.

14. The communication system of claim 13, further comprising the target UE and other UEs, where a preamble sent to the base station by the other UEs requesting random access differs from the preset first preamble.

15. The communication system of claim 14, wherein the system is configured to avoid the base station receiving two preambles sent by two UE both being the preset first preamble.

16. The communication system of claim 15, wherein the system is configured to guarantee that each time after broadcasting the paging information carrying the preset first preamble, the base station receives only one preset first preamble.

17. The communication system of claim 16, wherein the system is configured to prevent the target UE sending the preset first preamble from having to compete for access.

18. The communication system of claim 17, wherein the base station is configured to feed a random access response back to the target UE according to the preset first preamble fast and accurately, thus allowing the target UE to establish a communication connection with the base station fast, and avoiding a delay of the random access process.

* * * * *